March 2, 1954     F. R. BEAN     2,670,493
WINDSHIELD WIPER GUARD
Filed Aug. 13, 1951
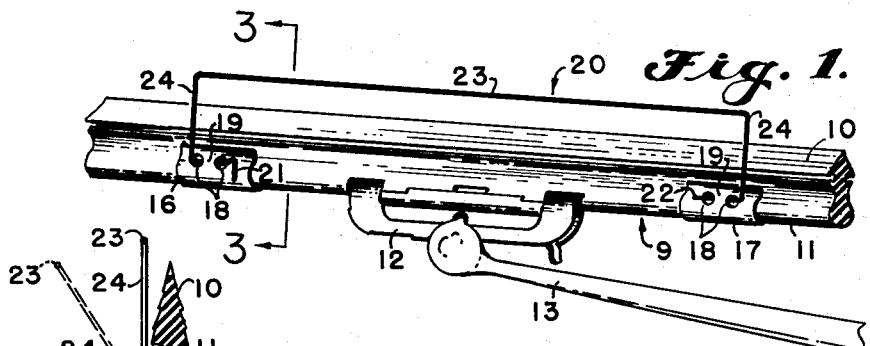
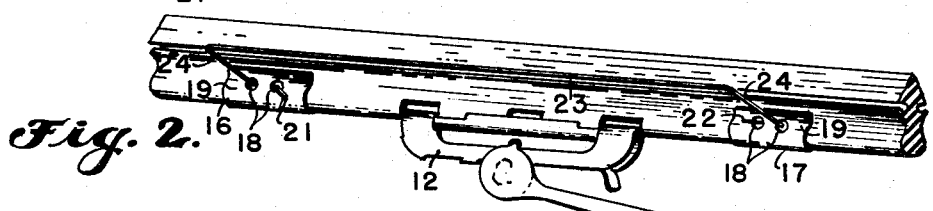
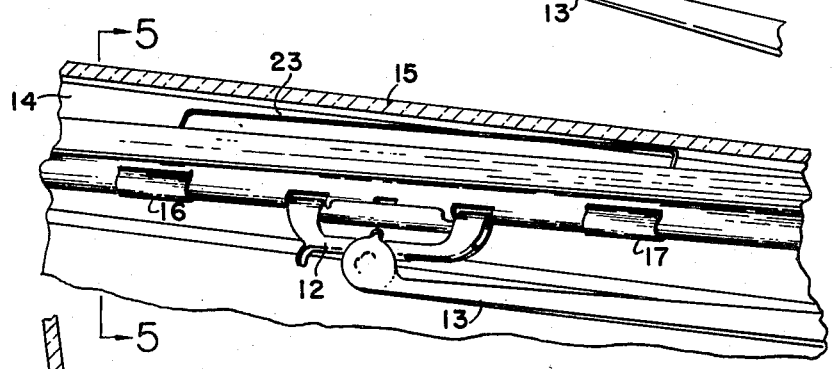
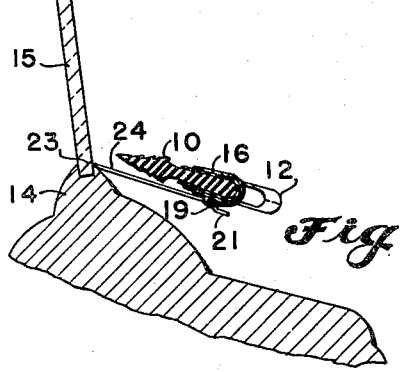
INVENTOR.
Fields R. Bean
BY
Stedman B Hoar
Agent Patented Mar. 2, 1954

2,670,493

UNITED STATES PATENT OFFICE 2,670,493

WINDSHIELD WIPER GUARD

Fields R. Bean, Del Mar, Calif.

Application August 13, 1951, Serial No. 241,560

4 Claims. (Cl. 15—255)

This invention relates to windshield wipers, and more particularly relates to an attachment which may be added to automobile windshield wipers of conventional construction to protect them when not in operation.

Modern automobiles are usually provided with windshield wipers which sweep in half circles upwardly from the lower margin of the windshield and which have thin, elongated rubber blades mounted in metallic backing to hold them longitudinally rigid. When the motivating power, which may be either electric or pneumatic, is cut off, the wipers return to positions at one end of their half-circle sweeps and in contact with the lower frame of the windshield pane. In these positions the wipers may remain for long periods of time, and in hot weather the rubber may melt to the glass or frame and in cold weather it may freeze thereto, making it difficult to start the wiper in operation again, and sometimes tearing small pieces from the flexible edge of the rubber blade. If not frozen or melted to the glass, the thin rubber blade may still be pressed against the glass or frame with a pressure which results in permanent distortion and subsequent incomplete wiping.

It is an object of this invention to provide an attachment for windshield wiper blades which will lift the blade out of contact with the glass or frame at the return or non-operational end of the half-circle stroke, thereby preventing melting, freezing, or distorting pressure on the rubber blade when the wiper is not in use.

A further object of this invention is to provide a simple inexpensive attachment for the purpose stated, which may be attached to all known types of windshield wiper blades.

Another object of this invention is to provide a lifting attachment for a windshield wiper blade which lifts the blade at the end of the blade stroke and which normally lifts itself out of contact with the glass during the stroke so as not to scratch the glass or reduce the sweeping pressure of the blade upon the glass. Another object of the invention is to provide an auxiliary metallic blade for cutting ice from a windshield.

To accomplish the above objects, and others which will be hereinafter apparent, my invention broadly comprises a light spring wire and a pair of clips or slides which attach the ends of the wire to the metal backing of the wiper blade. The ends of the wire are held rotatably in the clips, and the central portion of the wire is bent outwardly so as to extend beyond the rubber blade when the wire and the blade are in substantially parallel planes. The clips and wire ends are so formed as to place the wire under torque as it is moved towards a plane parallel to the blade, thereby permitting the wire to approach closely to such a plane only when under lateral pressure and causing it to swing from its extended position beyond the rubber blade when lateral pressure is removed.

In the accompanying drawing, illustrative of a presently preferred embodiment of my invention, Fig. 1 shows my attachment attached to a conventional windshield wiper blade with the wire extending beyond the blade in a plane substantially parallel thereto as if responsive to lateral pressure, the viewpoint being from that side of a blade toward which the blade moves when its motivating power is cut off;

Fig. 2, from the same viewpoint as Fig. 1, shows the wire extended at an angle to the blade in the position assumed when lateral pressure on the wire is removed;

Fig. 3 is a sectional view on the line 3—3 of Fig. 1, and on an enlarged scale, the wire also being shown in dotted line in the position of Fig. 2.

Fig. 4 is a view from above of a wiper blade at the end of its downward sweep, contiguous automobile parts being shown, and the blade being shown as separated therefrom by my attachment; and Fig. 5 is a sectional view on the plane of section 5—5 of Fig. 4.

Having reference to the details of the drawing, I have shown a windshield wiper blade 9 of ordinary construction, having a flexible rubber wiper or squeegee 10 held in a rigid backing member 11 and pivotally attached by a locking member 12 to an operating arm 13. It will be understood that the wiper blade 9 is swung arcuately by the arm 13 by electric, pneumatic, or other suitable power means not shown, and that such power means are biased in the usual manner to sweep the blade to one end of its arc of traverse whenever the motivating power is cut off. In the application of my invention chosen for illustration, the wiper blade 9 is swung through an upward half-circle terminating at or adjacent to the lower frame member 14 of a windshield 15 (Figs. 4 and 5).

To the backing member 11 are secured spaced clips 16 and 17 which as illustrated are channelled slides adapted to slide over the ends of the member 11 and to be held by frictional engagement therewith but they may be pressed on or secured to the member 11 in any suitable manner. Each of the clips 16 and 17 has a pair of holes 18, and the material between the holes 18 is raised and offset from the adjacent material to permit passage of a wire through the respective holes and between the intervening portion of the clips and the member 11. Each pair of holes 18 and the respective intervening clip material thus form a bearing 19 in which a wire may be held. The bearings 19 are formed on that side of the clips 16 and 17 toward which the blade 9 moves when its motivating power is cut off.

A wire 20, of some springiness and toughness and preferably rustproof, such as the material of a wire fishing leader, has its ends 21 and 22 rotatably held in the bearings 19. As shown, the wire ends 21 and 22 are convergently inserted through the bearings 19 to better maintain the clips 16 and 17 in suitable spaced relationship, but they obviously may extend oppositely. The central portion 23 of the wire 20 is offset from the alignment of the bearing 19, the offsets 24 being of sufficient length to permit the portion 23 to swing to a position in which it extends in the same general direction as the squeegee 10 but projects beyond the working edge of the squeegee and is substantially parallel to the squeegee. When the wire 20 approaches the above-described position, shown in solid line in Fig. 3, the offsets 24 come into contact with the clips 16 and 17, and due to their springiness they will yield slightly but will tend to urge the wire to swing back toward the lateral position shown in broken line in Fig. 3 in which it lies outwardly from the plane in which the squeegee 10 normally moves—that is, the plane surface of the windshield 15. One end of the wire 20, which may be the end 21, is offset so as to be brought into contact with the clip 16 as the central portion 23 swings to the aforesaid lateral position, thus limiting the swing of the central portion 23 to an angular relationship with the blade 9 in which the central wire portion 23 will have a slight clearance from the windshield 15 but will come into contact with the windshield frame 14 as the blade 9 approaches the frame.

The operation of my windshield wiper guard is entirely automatic. When the blade 9 is moving through its arc, the central portion 23 of the wire 20 is held by the oppositely acting offsets 24 and offset end 21 in the lateral position in which it is slightly spaced from the windshield 15. When the motivating power for the blade 9 is shut off and the blade moves to its inactive position at the end of its arc of traverse, the central wire portion 23 makes contact with the frame 14 and is pressed thereby to the projected position shown in Fig. 5. In this position it extends beyond the squeegee 10 and lifts the squeegee from the windshield 15. The squeegee is thus prevented from either melting or freezing to the windshield while inactive. On the other hand, if snow or ice builds up upon the windshield to the slight depth necessary to reach the lateral position of the central wire portion 23, the wire will react to the snow or ice pressure during movement in one arcuate direction as if in contact with the windshield frame, and will lift the squeegee from the glass and will itself scrape the glass like a knife blade. On the opposite stroke of the blade 9 the wire will return to its lateral position, permitting the squeegee to wipe the shaved snow or ice from the glass. The guard thereby acts as an auxiliary blade in the dangerous ice or snow conditions set forth.

It is to be understood that modifications may be made in my invention without departure from its spirit, and I desire to have the scope of my invention considered as not limited to the specific showing herein but as coextensive with the appended claims.

I claim:

1. In a windshield wiper having an elongated blade arranged for lateral arcuate movement to and from a position in which one side of said blade is substantially contiguous to a frame portion of a windshield: an elongated member having its ends rotatably secured to said blade and a central portion offset from said ends so as to lie in an extended position beyond the edge of said blade when said member is rotated to a plane permitting such extension, said member then lifting said blade from said windshield; and resilient means urging said member to a position in which said central portion of said member extends laterally from said one side of said blade and is slightly removed from the plane in which the blade edge moves, said means yielding to permit said member to rotate to said extended position, whereby lateral pressure of said frame portion against said member causes said member to assume said extended position.

2. In a windshield wiper having an elongated principal blade arranged for lateral sweeping movement in resilient contact with a plane surface: spaced bearings carried by said principal blade; an auxiliary blade mounted in said bearings and rotatable between a position substantially parallel to said principal blade in which the edge of said auxiliary blade extends slightly beyond the plane in which the edge of said principal blade operates and a position inclined to said principal blade in which the edge of said auxiliary blade is slightly retracted from said plane; and resilient means urging said auxiliary blade to assume said last-defined position and yieldable to permit said auxiliary blade to assume said first-defined position.

3. A guard for a windshield wiper blade inclusive of a flexible squeegee and a rigid backing therefor, comprising: a pair of clips attachable to said backing, each of said clips having a bearing in cooperative alignment with the other of said bearings; and a wire rotatably held in said bearings and having its portion intermediate of said bearings offset so as to be rotatable to a position parallel to and beyond the working edge of said squeegee in which it may raise said squeegee from a windshield, said wire having a second offset portion then resiliently engaging said blade to urge said intermediate portion to a position permitting contact of said squeegee with said windshield.

4. A guard for a windshield wiper blade comprising: a wire member having end portions offset from and parallel to its central portion; bearings for said end portions attachable to said blade so as to permit said central portion to swing parallel to and beyond the working edge of said blade; and resilient means urging said central portion to swing to a position slightly retracted from the plane to which said blade edge is normal and contiguous.

FIELDS R. BEAN.

References Cited in the file of this patent

UNITED STATES PATENTS

| Number | Name | Date |
|---|---|---|
| 1,813,604 | Berge | July 7, 1931 |
| 2,086,453 | Ward | July 6, 1937 |